(12) United States Patent
Park et al.

(10) Patent No.: US 7,542,027 B2
(45) Date of Patent: Jun. 2, 2009

(54) DISPLAY SYSTEM

(75) Inventors: Dong-sik Park, Suwon-si (KR); Young-chan Kim, Eujwang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 591 days.

(21) Appl. No.: 11/009,541

(22) Filed: Dec. 13, 2004

(65) Prior Publication Data

US 2005/0204284 A1    Sep. 15, 2005

(30) Foreign Application Priority Data

Dec. 13, 2003    (KR)    ............ 10-2003-0090924

(51) Int. Cl.
*G09G 5/00*    (2006.01)

(52) U.S. Cl. .............. 345/156; 345/168; 345/204; 345/211

(58) Field of Classification Search ......... 345/156, 345/168, 204, 211
See application file for complete search history.

(56) References Cited

U.S. PATENT DOCUMENTS

| | | | |
|---|---|---|---|
| 5,532,719 A * | 7/1996 | Kikinis ................... | 345/211 |
| 5,570,108 A | 10/1996 | McLaughlin et al. | |
| 5,648,795 A * | 7/1997 | Vouri et al. .............. | 345/698 |
| 5,767,834 A * | 6/1998 | Vouri et al. .............. | 345/698 |
| 5,963,266 A * | 10/1999 | Fujimori ................. | 348/511 |
| 6,005,544 A | 12/1999 | Eglit | |
| 6,169,535 B1 | 1/2001 | Lee ....................... | 345/145 |
| 6,211,855 B1 | 4/2001 | Kim ...................... | 345/127 |

(Continued)

FOREIGN PATENT DOCUMENTS

EP    0 766 220 A1    4/1997

(Continued)

OTHER PUBLICATIONS

International Search Report issued by the ISA/KR on Sep. 15, 2004.

(Continued)

*Primary Examiner*—Amare Mengistu
*Assistant Examiner*—Robert R Rainey
(74) *Attorney, Agent, or Firm*—Staas & Halsey LLP (57) ABSTRACT

A display system displaying an image on a basis of an image signal received from an image signal source, including: a key signal generator generating a key signal according to a user's manipulation; a configuration controller providing a GUI for controlling a display state of the image, and outputting a control order corresponding to the user's manipulation on the GUI, and detecting whether a user's access to the GUI is limited; and a display controller controlling the display state of the image on a basis of the control order received from the configuration controller, recognizing the key signal as a first control signal to implement a pre-set control function according to the recognized first control signal if the key signal is input from a key signal input part while determining that the user's access to the GUI is not limited, and recognizing the key signal as a second control signal to control the display state of the image according to the recognized second control signal if the key signal is input from the key signal input part while determining that the user's access to the GUI is limited.

26 Claims, 5 Drawing Sheets

U.S. PATENT DOCUMENTS

| | | | |
|---|---|---|---|
| 6,215,467 B1 * | 4/2001 | Suga et al. | 345/660 |
| 6,323,849 B1 * | 11/2001 | He et al. | 345/204 |
| 6,477,594 B1 * | 11/2002 | Tung | 710/104 |
| 6,552,738 B1 | 4/2003 | Lin et al. | |
| 6,646,685 B1 * | 11/2003 | Kim | 348/569 |
| 6,734,846 B1 * | 5/2004 | Yang et al. | 345/213 |
| 6,768,498 B1 * | 7/2004 | Kim | 345/698 |
| 6,798,460 B2 * | 9/2004 | Saiki et al. | 348/553 |
| 6,879,331 B2 * | 4/2005 | Cragun | 345/661 |
| 7,061,545 B1 * | 6/2006 | Kweon et al. | 348/569 |
| 7,068,293 B2 * | 6/2006 | Wang | 345/698 |
| 7,180,511 B2 * | 2/2007 | Shigeta | 345/204 |
| 7,210,047 B2 * | 4/2007 | Liebenow | 713/300 |
| 2003/0081009 A1 | 5/2003 | Seo | |
| 2003/0184572 A1 * | 10/2003 | Kaise | 345/698 |
| 2004/0183823 A1 * | 9/2004 | Wang | 345/699 |
| 2005/0157948 A1 * | 7/2005 | Lee | 382/299 |

FOREIGN PATENT DOCUMENTS

| | | |
|---|---|---|
| GB | 2348093 | 9/2000 |
| JP | 11-15425 | 1/1999 |
| JP | 11-119752 | 4/1999 |
| JP | 2000-243037 | 8/2000 |
| KR | 2000-28144 | 5/2000 |
| KR | 10-333531 | 4/2002 |
| KR | 10-351823 | 8/2002 |
| KR | 2003-34993 | 5/2003 |
| KR | 2003-41206 | 5/2003 |

OTHER PUBLICATIONS

A Graphical Method For Determining The Logged On User by Larry M. Peterson et al.: Motorola Technical Developments, vol. 24, Mar. 1995 (pp. 20-21).

Supplementary European Search Report dated Oct. 16, 2007 issued in European Patent Application No. 04748485.

* cited by examiner

DISPLAY SYSTEM

CROSS-REFERENCE TO RELATED APPLICATION

This application claims the benefit of Korean Patent Application No. 2003-0090924, filed Dec. 13, 2003 in the Korean Intellectual Property Office, the disclosure of which is incorporated herein by reference.

BACKGROUND OF THE INVENTION

1. Field of the Invention

The present invention relates to a display system, particularly to, a display system providing a graphic user interface convenient for controlling a display state of an image, and converting a function of a key signal input part when an access to the graphic user interface is limited.

2. Description of the Related Art

A monitor, as an example of a display system, is an apparatus displaying an image by receiving an image signal such as a horizontal/vertical sync signal (H/V sync signal), a Red signal (R-signal), a Green signal (G-signal), and a Blue signal (B-signal) from a graphic controller of a computer.

Figure 1:
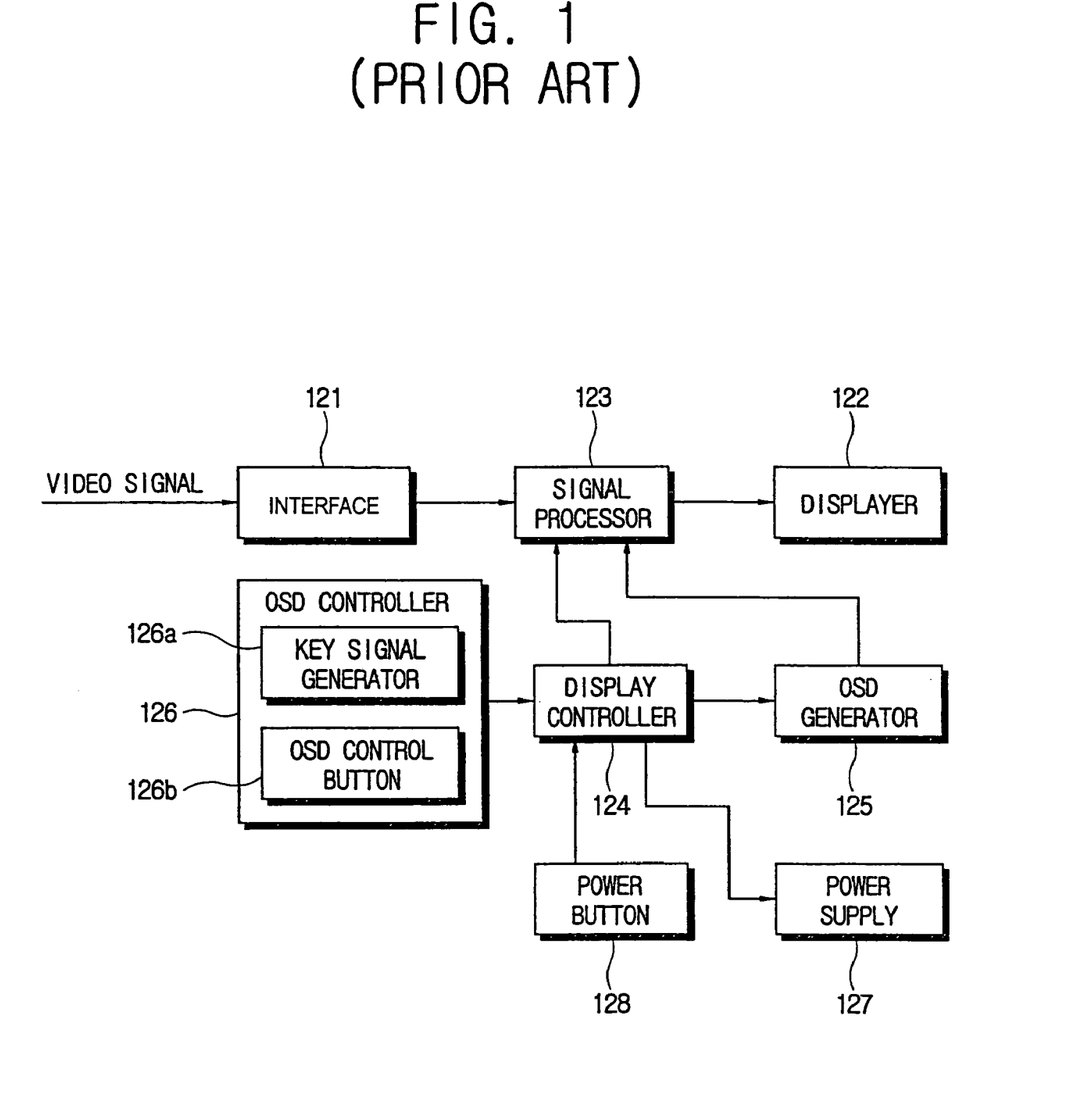
FIG. 1 is a control block diagram of a conventional display device.
Figure 2:
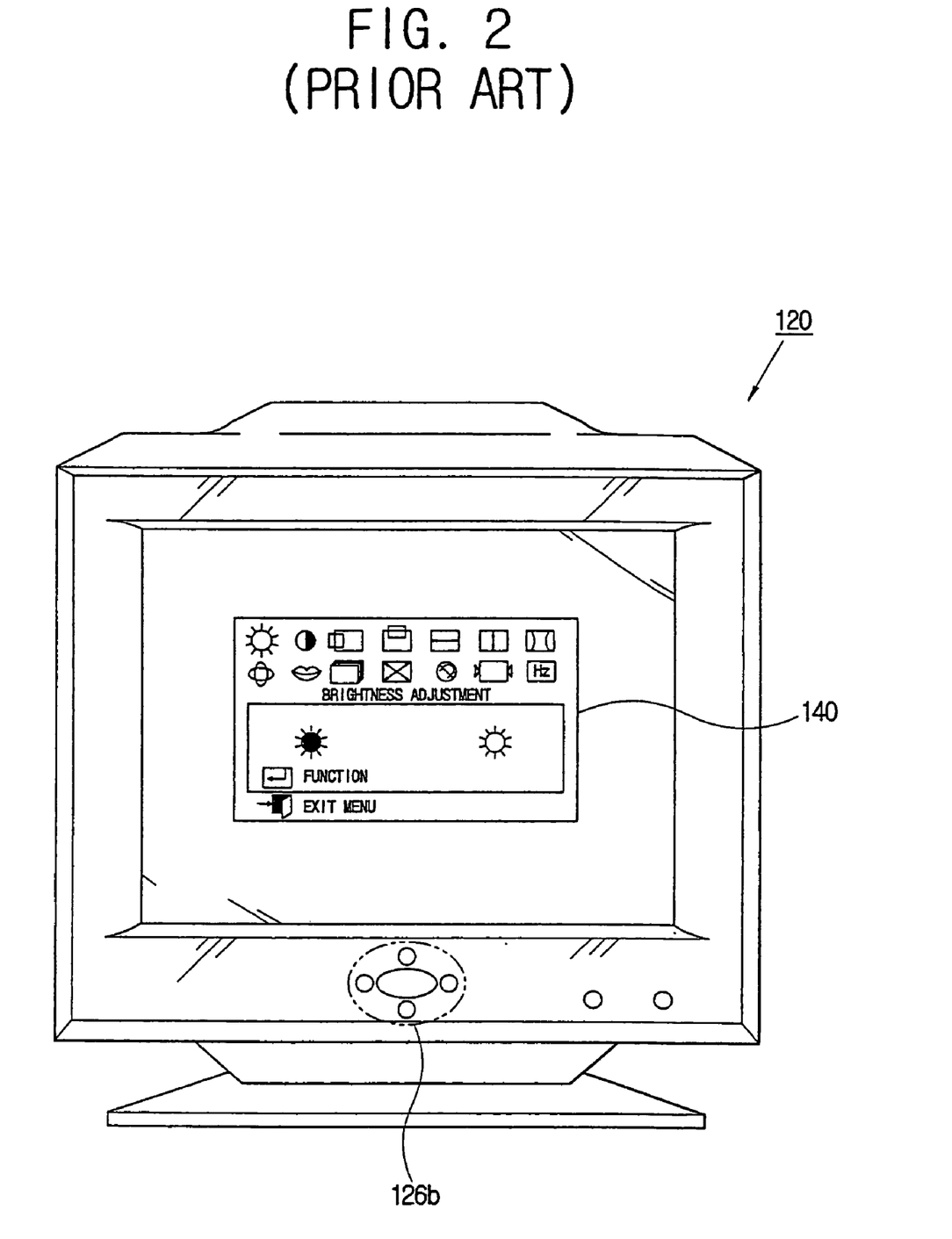
FIG. 2 is a front view of the conventional display device of FIG. 1 with a displayed OSD panel.

As shown in FIGS. 1 and 2, a conventional display system 120 has an interface part 121 receiving an image signal, a displayer 122 displaying an image, a signal processor 123 converting the image signal received from the interface part 121 into a signal displayable by the displayer 122, an On-Screen-Display (OSD) signal generator 125 generating an OSD signal, an OSD selector 126 generating a key signal, a microcomputer or display controller 124 controlling the above components, and a power supply 127.

The OSD selector 126 comprises an OSD control button 126b provided on a front of the display system 120, and a key signal generator 126a generating the key signal corresponding to manipulation of a key with the OSD control button 126b. Accordingly, if a user manipulates the OSD control button 126b, the key signal generator 126a applies the key signal corresponding to the manipulation of the OSD control button 126b to the microcomputer or display controller 124. The microcomputer or display controller 124 controls the OSD generator 125 according to the key signal applied by the key signal generator 126a to display an OSD panel 140 on the displayer 122. Accordingly, image display features such as brightness, contrast, and size can be adjusted.

Meanwhile, a power button 128 is provided near to the OSD control button 126b on the front of the display system 120. Herein, if the user presses the power button 128, the depressed state is recognized by microcomputer 124, and the microcomputer 124 controls the power supply 127 to supply or shut down power turning on or off the components.

However, in the conventional display system 120, a method of controlling the image display features has the following disadvantages.

Firstly, the display system 120 comprises a memory such as an Electrically Erasable Programmable Read-Only Memory (EEPROM) storing data and a program for configuring the OSD panel 140. The memory provided in the display system 120 has a limitation in the storing capacity of data or programs for configuring the OSD panel 140 due to physical properties of the memory. For such reason, the configuration of the OSD panel 140 is simplified and the user cannot be provided with enough information for adjusting the display state of the image through the OSD panel 140. Accordingly, the conventional display system 120 has the disadvantage that the user needs to be supplied with a separate manual book explaining how to manipulate the OSD or how to adjust the image display features, and the user needs to refer to the provided manual book.

Secondly, since the OSD control button 126b is installed on the front of the display system 120, several control buttons cannot be installed on the display due to limited space. Accordingly, it is inconvenient for the user to manipulate the control button several times to adjust the image display features of the display system 120.

Accordingly, in the conventional display system 120, a solution to the problems caused by the limited storage capacity of the memory for storing data and programs for configuring the OSD panel 140 and the inconvenience of manipulating the user interface, can be overcome by the image display feature being manipulated by a computer having a storage capacity larger than the display system 120, thus making it convenient for the user to manipulate the key. In this way, a user interface that is more convenient for controlling the image display features can be provided.

SUMMARY OF THE INVENTION

Accordingly, it is an aspect of the present invention to provide a display system that can provide a graphic user interface convenient for controlling image display features, and to provide a display system capable of controlling the image display features by converting a function of a key signal input part when a user's access to the graphic user interface is limited in a certain state.

Additional aspects and/or advantages of the invention will be set forth in part in the description which follows and, in part, will be obvious from the description, or may be learned by practice of the invention.

The foregoing and/or other aspects of the present invention are achieved by providing a display system displaying an image on a basis of an image signal received from an image signal source, including: a key signal generator generating a key signal according to a user's manipulation; a configuration controller providing a GUI with a key signal for controlling image display features, and outputting a control order corresponding to the user's manipulation on the GUI, and detecting whether a user's access to the GUI is limited; and a display controller controlling the image display features based on the control order received from the configuration controller, recognizing the key signal as a first control signal to implement a pre-set control function according to the recognized first control signal when the key signal is input from the key signal input part while determining through the configuration controller if the user's access to the GUI is not limited, and recognizing the key signal as a second control signal to control the image display features according to the recognized second control signal when the key signal is input from the key signal input part while determining through the configuration controller if the user's access to the GUI is limited.

According to an aspect of the invention, the configuration controller comprises an image display feature configuration program installed in the image signal source and driven based on an operating system of the image signal source.

According to an aspect of the invention, the display system further comprises an interface capable of communicating with the image signal source and vice versa, wherein the image display features configuration program outputs information on whether the user's access to the GUI is limited or not to the display controller through the interface part.

According to an aspect of the invention, the image display feature configuration program recognizes that the user's access to the GUI is limited when a size of the image provided by a program activating based on the operating system of the image signal source is smaller than a size of a desktop screen provided by the operating system of the image signal source, and recognizes that the user's access to the GUI is limited when the size of the image provided by the program activating on the operating system of the computer is bigger than the size of the image of the desktop screen provided by the operating system of the computer.

According to an aspect of the invention, the image display feature configuration program reads data on the size of the image provided by the activating program and the size of the desktop screen provided by the operating system of the image signal source from a registry of the image signal source.

According to an aspect of the invention, the display controller implements an automatic screen adjustment function when the input key signal is recognized as the second control signal.

According to an aspect of the invention, the display system further comprises an OSD generator displaying an OSD screen for controlling the image display features, wherein the display controller controls the OSD generator to display the OSD screen when the input key signal is recognized as the second control signal.

According to an aspect of the invention, the display controller turns power on or off according to the first control signal when the input key signal is recognized as the first control signal.

According to an aspect of the invention, the display controller recognizes the input key signal as the first control signal to turn the power on or off according to the first control signal when the key signal is input from the key signal input part while the image signal is not received from the image signal source.

According to an aspect of the invention, the display controller recognizes the input key signal as the second control signal when the key signal is input from the key signal input part while the image display feature configuration program does not transfer information on whether the user's access to the GUI is limited or not to the display controller.

According to an aspect of the invention, a state when the image display feature configuration program does not transfer the information on whether the user's access to the GUI is limited or not comprises a state when the image signal source is driven by an operating system other than the operating system driving the display state configuration.

According to another aspect of the present invention, there is provided a computer readable medium encoded with processing instructions for a computer performing a method of displaying an image, the method comprising: receiving a key signal generated according to a user's manipulation; providing a GUI for controlling a display state of the image, and outputting a control order corresponding to the user's manipulation on the GUI, and detecting whether a user's access to the GUI is limited; and controlling the display state of the image based on the control order, recognizing the inputted key signal as a first control signal to implement a pre-set control function according to the recognized first control signal in a case that the key signal is inputted from the key signal input part while it is determined by the configuration controller that the user's access to the GUI is not limited, and recognizing the inputted key signal as a second control signal to control the display state of the image according to the recognized second control signal in a case that the key signal is inputted from the key signal input part while it is determined by the configuration controller that the user's access to the GUI is limited.

BRIEF DESCRIPTION OF THE DRAWINGS

These and/or other aspects and advantages of the present invention will become apparent and more readily appreciated from the following description of the aspects, taken in conjunction with the accompanying drawings of which.

DETAILED DESCRIPTION OF THE EMBODIMENTS

Reference will now be made in detail to the aspects of the present invention, examples of which are illustrated in the accompanying drawings, wherein like reference numerals refer to like elements throughout. The aspects are described below in order to explain the present invention by referring to the figures.

Figure 3:
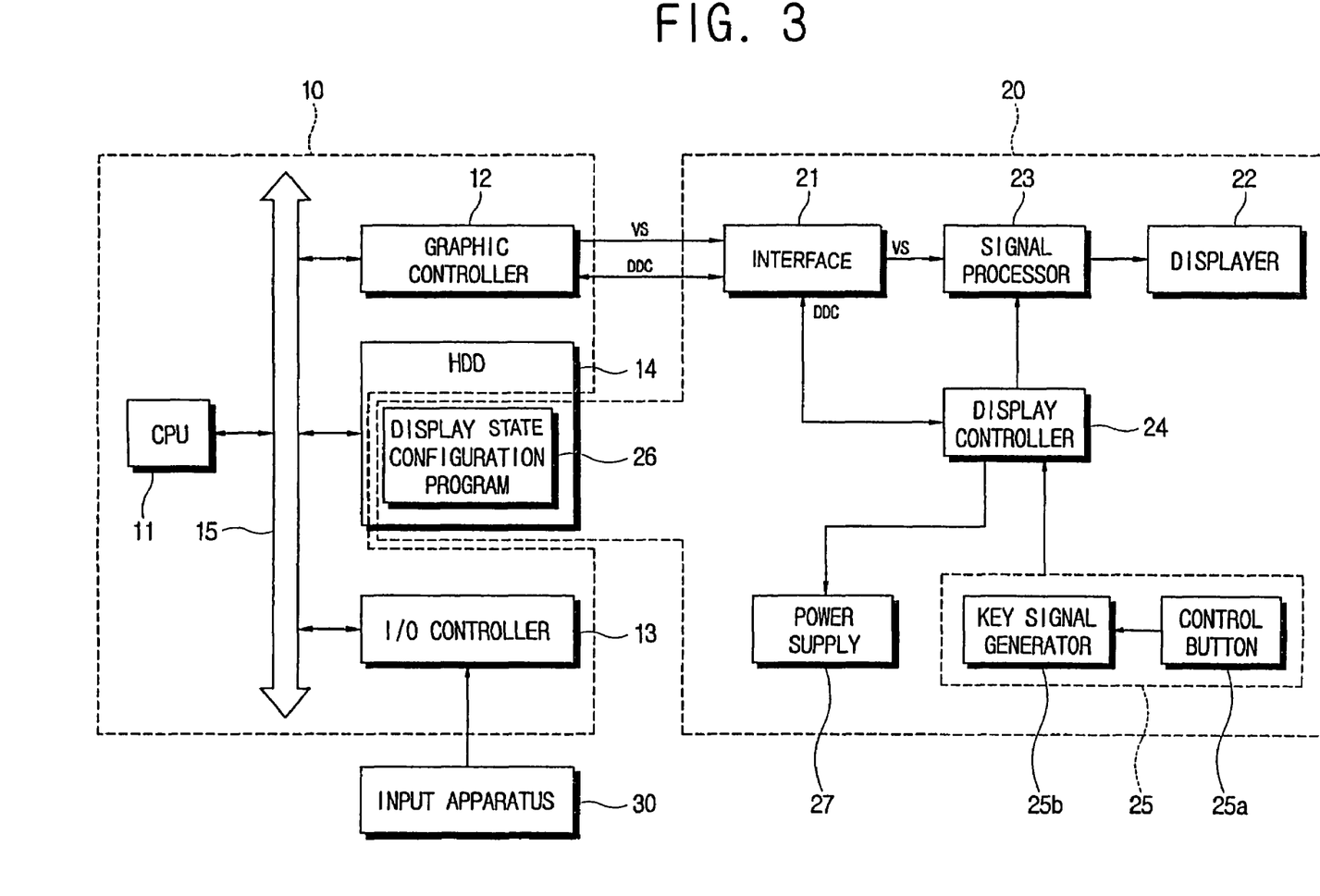
FIG. 3 is a control block diagram of a display system according to an embodiment of the present invention.

As shown FIG. 3, a display system 20 according to an embodiment of the present invention displays an image based on an image signal received from an image signal source. A computer 10 is shown as the image signal source outputting an image signal to the display system 20 according to an aspect of the present invention. The computer comprises a central processing unit (CPU) 11, a graphic controller 12 processing an image signal output to the display system 20, an input/output (I/O) controller 13 connected to an input apparatus such as a keyboard or a mouse and processing a signal input from the input apparatus, a hard disk drive 14 storing an operating system or a plurality of application programs running on the operating system, and a system bus 15 connecting the components. However, it is understood that other image sources can be used.

The display system 20 according to an embodiment of the present invention comprises a power supply 27 supplying power, a interface part 21 connected to the graphic controller 12 of the computer 10 and receiving an image signal, a displayer 22 displaying an image, a signal processor 23 converting the image signal received from the interface part 21 into the image signal displayable by the displayer 22, a key signal input part 25 generating a key signal according to user's manipulation, and a display controller 24 controlling those components.

The power supply 27 supplies or shuts the power to the display system 20 according to the control of the display controller 24. Herein, the display controller 24 controls the power supply 27 to supply or shut the power according to the key signal inputted from the key signal input part 25 under a certain condition. This process will be described in detail below.

The interface part 21 receives the image signal output from the graphic controller 12 of the computer 10. The image signal received from the graphic controller 12 comprises a R-signal, a G-signal, a B-signal, and a H/V signal. The interface part 21 may be connected to the graphic controller 12 of the computer 10 through various connections, such as a D-sub connector, or a DVI terminal.

Also, the interface part 21 according to an embodiment of the present invention provides an interface capable of full duplex with the computer 10. Accordingly, the computer 10 can transmit data other than the image signal to the display system 20, and the display system 20 can transmit data to the computer 10 through the interface part 21. The interface part 21 according to an embodiment of the present invention is an interface part that supports a digital data channel (DDC) function enabling full duplex with the computer 10, as an example. However, different types of interfaces capable of full duplex, such as a universal serial bus (USB) interface, can be applied. Herein, the DDC function, that is a standard communication channel set by the video electronics standard association (VESA) to realize a function such as automatic environment configuration, or a plug-and-play function in the display system 20, regulates signal lines and a process order used to exchange data between the computer 10 and the display system 20.

The displayer 22 and the signal processor 23 of the display system 20 according to am embodiment of the present invention may be provided in various configurations according to the type of display system 20. For example, if the display system 20 according to an embodiment of the present invention is a liquid crystal display (LCD), the signal processor 23 may comprise an A/D converter converting the H/V sync signal, the R-signal, the G-signal, and the B-signal input through the interface part 21 into a digital image signal, and a scaler (not shown) scaling the digital image signal outputted from the A/D converter. Also, if the display system 20 according to an embodiment of the present invention is an LCD, the displayer 22 may comprise an LCD panel displaying the image, a panel driver driving the LCD panel, and a back light unit emitting light to the LCD panel. Additionally, the display system 20 according to an embodiment of the present invention may be a cathode ray tube (CRT), the signal processor 23 may comprise an amplifier amplifying the image signal input through the interface part 21, a vertical and horizontal deflector to deflect an electron beam based on the H/V sync signal. Also, if the display system 20 according to other embodiments of the present invention is a plasma display panel (PDP) or a digital light processor (DLP), the signal processor 23 may be provided. Additional types of displayers 22, such as organic light emitting diodes (OLEDs), and can be similarly used.

The display controller 24 controls the signal processor 23 and the displayer 22 so that an image displaying feature displayed on the displayer 22 can be controlled based on a pre-set variable set for a control of the displaying state of the image. Herein, the pre-set variable for the control of the displaying state of the image is stored in a memory such as an EEPROM (not shown).

The key signal input part 25 comprises a control button 25a provided on a front of the display system 20, and a key signal generator 25b generating a key signal corresponding to a key manipulation of the control button 25a. Herein, if the user manipulates the control button 25a, the key signal generator 25b generates a key signal corresponding to the manipulation of the user, and the key signal outputted from the key signal generator 25b is inputted to the display controller 24.

Meanwhile, the display system 20 according to an embodiment of the present invention comprises a configuration controller providing a graphic user interface (GUI) provided in the computer 10 controlling the image display feature displayed on the displayer 22. The configuration controller according to the shown embodiment of the present invention comprises an image display feature configuration program 26 installed in the computer 10 and operating based on the operating system of the computer 10. In other words, the image display feature configuration program 26 is installed in the computer 10 and stored in the hard disk drive 14 and operated based on the operating system of the computer 10.

Herein, if the user manipulates the GUI with the input apparatus, the display state configuration program 26 transfers a control order corresponding to user's manipulation to the display controller 24 using the interface part 21 such as the DDC communication line. Herein, the display controller 24 controls the signal processor 23 and the displayer 22 to change the display state of the image based on the control order received through the interface part 21. Accordingly, adjustment of the image display features becomes more convenient by using the input apparatus such as the mouse. Also, an on-screen display (OSD) controller provided in the conventional display system 20 can be removed.

Also, the display state configuration program 26 according to an embodiment of the present invention detects whether a user's access to the GUI is limited or not. As the image display state configuration program 26 according to an embodiment of the present invention is driven based on the operating system of the computer 10, there comes a situation where execution of the display state configuration program 26 by the user is limited under a certain state. For example, when the computer 10 executes a game program, the game displayed on the displayer 22 is executed in a full screen mode on a whole screen of the displayer 22. As a result, the user is limited in access to execution means such as an execution icon of the display state configuration program 26. Also, since the game is executed with a resolution for the game, the screen blinks when the game is executed. In such case, the user wants to adjust the display state while monitoring the display of the game. Accordingly, an embodiment of the present invention detects a case when the user's access to the display state configuration program 26 is limited.

Herein, the display state configuration program 26 detects whether the user's access to the display state configuration program 26 is limited by comparing a size of an image provided by a program executed in the operating program of the computer 10 and a size of a desktop screen provided by the operating system of the computer 10. In other words, because the size of the image provided by the program executed with a full screen such as the game is the same as or bigger than the size of the image provided by the operating system of the computer 10, the display state configuration program 26 determines that the user's access to the display state configuration program 26 is limited. Herein, the display state configuration program 26 reads data of the size of the image provided by the activating program and the size of the desktop screen provided by the operating system of the computer 10 from a registry of the computer 10.

Also, the display state configuration program 26 transfers information on whether the user's access to the GUI is limited to the display controller 24 through the interface part 21. The display state configuration program 26 according to an embodiment of the present invention transfers a function preservation signal to the display controller 24 periodically through the interface part 21 when the user's access to the GUI is not limited. Also, it transfers the information on whether the user's access to the GUI is limited or not by blocking the function preservation signal when the user's access to the GUI is limited. Also, a display state configuration program 26 according to another embodiment of the present invention outputs the function preservation signal if the user's access to the GUI is not limited, while it outputs a function shift signal if the user's access to the GUI is limited, so that it can transfer the information on whether the user's access to the GUI is limited or not to the display controller 24.

Meanwhile, the display controller 24 receives the information on whether the user's access to the GUI is limited or not from the display state configuration program 26 through the interface part 21. Also, the display controller 24 recognizes the key signal input from the key signal input part 25 as a control signal to implement various functions according to the information on whether the user's access to the GUI is limited.

Herein, the display controller 24 recognizes an input key signal as a first control signal and implements a pre-set control function when it is determined that the user's access to the GUI is not limited, or that the key signal is input from the key signal input part 25 with the function preservation signal received through the interface part 21 as described above. In the embodiment of the present invention, the display controller 24 turns the power of the display system 20 on or off by controlling the power supply 27 to supply or shut the power according to the first control signal if the display controller 24 recognizes the key signal as the first control signal.

Meanwhile, the display controller 24 recognizes an input key signal as a second control signal and controls the image display state of the image according to the recognized second control signal if it is determined by the display state configuration program 26 that the user's access to the GUI is limited, or that the function shift signal is received through the interface part 21, or that the key signal is input from the key signal input part 25 with the function preservation signal not received as described above. In the embodiment of the present invention, if the display controller 24 recognizes the input key signal as the second control signal, the display controller 24 implements an automatic screen adjustment function on a basis of the second control signal.

Figure 4:
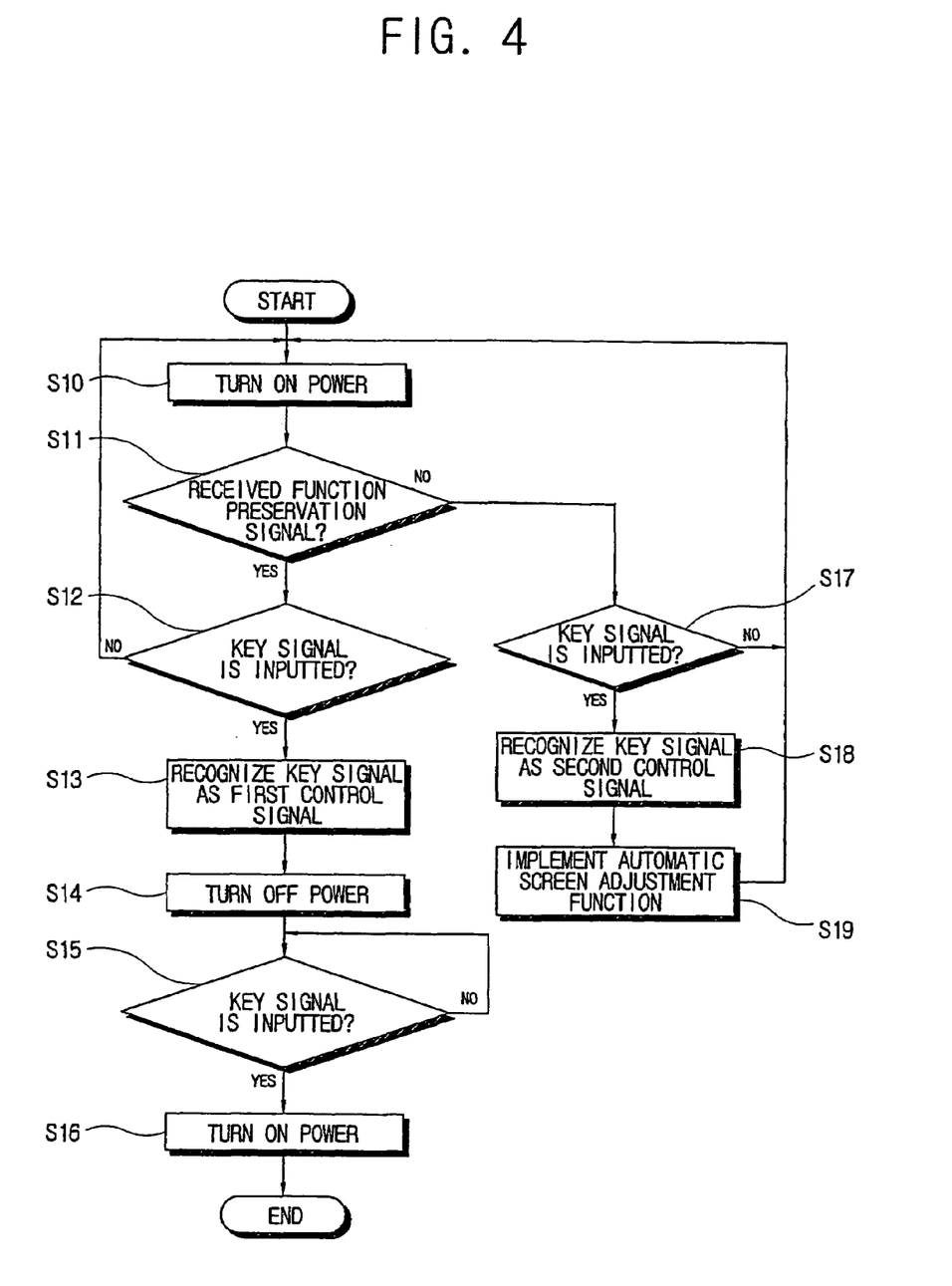
FIG. 4 is a control flow chart of the display system according to the embodiment of the present invention.

Hereinbelow, a control process of the display system 20 according to an embodiment of the present invention will be described with reference to FIG. 4. Herein, the display state configuration program 26 according to an embodiment of the present invention outputs the function preservation signal continuously if it is determined that the user's access to the GUI is not limited, and blocks the output of the function preservation signal if the user's access to the GUI is limited.

Firstly, if the display system 20 and the computer 10 are turned on at operation S10, the display state configuration program 26 outputs the function preservation signal continuously. Herein, the display controller 24 detects whether the function preservation signal is received or not through the interface part 21 at operation S11. If determined that the function preservation signal is received through the interface part 21, the display controller 24 determines that the user's access to the GUI is not limited. Herein, if the key signal is input from the key signal input part 25 according to the manipulation of the user at operation S12, the display controller 24 recognizes the input key signal as the first control signal at operation S13 and blocks the power supplied from the power supply 27 to turn the power off at operation S14.

Secondly, if the key signal is input from the key signal input part 25 again in a state that the power is off at operation S15, the display controller 24 recognizes the input key signal as the first control signal and controls the power supply 27 to supply the power to turn the power on at operation S16.

Meanwhile, if the function preservation signal is not received through the interface part 21 at operation S11, the display controller 24 determines that the user's access to the GUI is limited. Herein, if the key signal is input from the key signal input part 25 according to the manipulation of the user at operation S17, the display controller 24 recognizes the inputted key signal as the second control signal at operation S18, and implements the automatic screen adjustment function at operation S19.

Meanwhile, it is preferable, but not required, that the display controller 24 according to an embodiment of the present invention recognizes the input control signal as the first control signal and turns the power on or off if the image signal is not received from an image signal source, or that the key signal is input from the key signal input part 25 while the computer 10 is turned off or the key signal input part 25 is not connected to the computer 10. Accordingly, the key signal input part 25 can function as a power button when the key signal is not received from the computer 10.

Also, it is preferable, but not required, that the display controller 24 according to an embodiment of the present invention recognizes the input control signal as the second control signal and implements the automatic screen adjustment function when the control signal is not received from the display state configuration program 26 with information on whether the user's access to the GUI is limited. Herein, in case that the control signal is not received with information on whether the user's access to the GUI is limited comprises a case that the computer 10 operates on an operating system other than an operating system on which the display state configuration program 26 executes. For example, when the operating system of the computer 10 is Windows and the display state configuration program 26 executes based on Windows, the display state configuration program 26 cannot be executed if the user chooses to operate the computer 10 on a different operating system such as DOS or Linux. Accordingly, the display controller 24 recognizes the key signal input through the key signal input part 25 as the second control signal and implements the automatic screen adjustment function as the interface part 21 does not transfer any information on whether the user's access to the GUI is limited.

Figure 5:
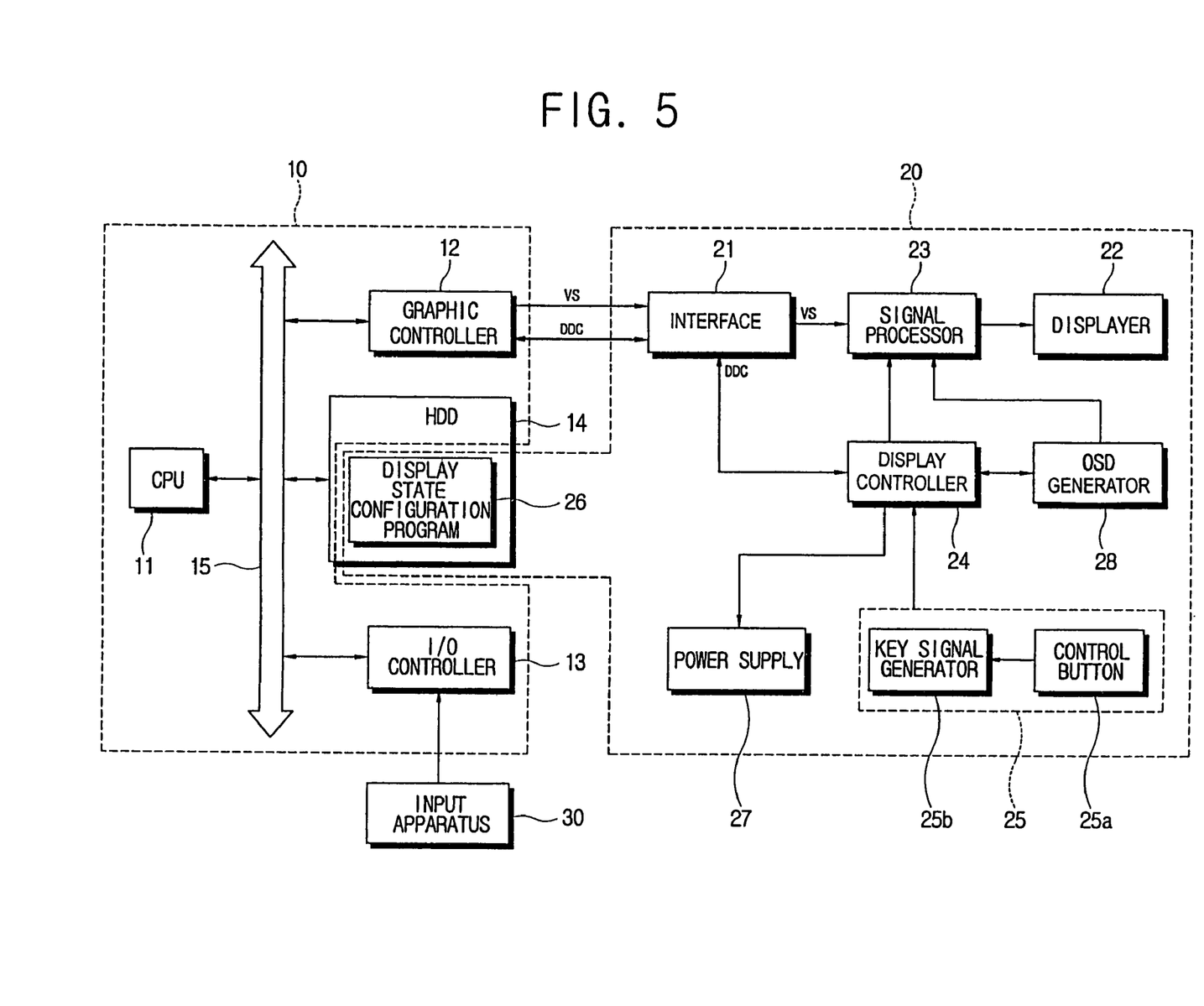
FIG. 5 is a control block diagram of a display system according to another embodiment of the present invention.

Meanwhile, as shown in FIG. 5, the display system 20 according to an embodiment of the present invention may further comprise an OSD generator 28 to display an OSD screen for configuration of the display state of the image. Herein, the display controller or microcomputer 24 may control the OSD generator 28 to display the OSD screen when the input key signal is recognized as the second control signal. Herein, the OSD generator 28 is preferably provided with a simpler configuration than a configuration of the OSD generator 125 of the conventional display system 120 shown in FIG. 1. For example, the OSD generator 28 according to an embodiment of the present invention is preferably provided to control several configuration variables selected out of the configuration variables to control the display state of the image. In other words, the OSD generator 28 can provide instructions to the OSD screen to modify the size of the image displayed on the displayer 22, and the display controller 24 can control the size of the image displayed on the displayer 22 according to the key signal input from the key signal input part 25. In this case, the display controller 24 does not implement the automatic screen adjustment function as shown at operation S19 in FIG. 4, but controls the configuration variables to control the display state of the image according to the key signal input from the key signal input part 25.

The embodiment of the present invention described above recognizes the key signal input from the key signal input part 25 as the first or second control signal according to whether the user's access to the GUI is limited or not. However, the display controller 24 may be provided to recognize that the control signal to turn the power on or off is received when the control button 25a of the key signal input part 25 is pressed for a certain period of time even if the key signal is recognized as the second control signal.

Also, the embodiment of the present invention described above turns the power on or off when the key signal input from the key signal input part 25 is recognized as the first control signal. However, it may be possible to implement a different pre-set function. For example, the key signal input part 25 may be an additional hot key to implement a function other than a function of power button, and the display controller 24 may recognize the signal input from the hot key as the second signal controlling the image display state according to whether the user's access to the GUI is limited or not.

As described above, the embodiment of the present invention can provide a GUI convenient for controlling the image display state and convert a function of the key signal input part 25 to control the image display state if the user's access to the GUI is limited by providing a key signal generator 25b generating the key signal according to user's manipulation, a configuration controller providing a GUI for controlling the display state of the image and outputting a control order corresponding to the user's manipulation of the GUI to detect whether the user's access to the GUI is limited, and a display controller 24 controlling the display state of the image based on the control signal received from the configuration controller and recognizing the input signal as a first control signal when the user's access to the GUI is not limited implementing a pre-set control function according to the first control signal, and recognizing the input signal as a second control signal when the key signal is input from the key signal input part 25 when the user's access to the GUI is limited and controlling the display state of the image according to the second control signal.

As described above, the embodiment of the present invention provides a display system with a GUI convenient for controlling the display state of the image.

Also, the present invention provides a display system converting a function of the key signal input part to control the display state of the image when the user's access to the GUI is limited in a certain state.

The aforementioned method of displaying an image may be embodied as a computer program that can be run by a computer, which can be a general or special purpose computer. Thus, it is understood that the display apparatus can be such a computer. Computer programmers in the art can easily reason codes and code segments, which constitute the computer program. The program is stored in a computer readable medium readable by the computer. When the program is read and run by a computer, the method of controlling the display apparatus is performed. Here, the computer-readable medium may be a magnetic recording medium, an optical recording medium, firmware, or other recordable media.

Although a few embodiments of the present invention have been shown and described, it will be appreciated by those skilled in the art that changes may be made in these aspects without departing from the principles and spirit of the invention, the scope of which is defined in the appended claims and their equivalents.

What is claimed is:

1. A display apparatus displaying an image based on an image signal received from an image signal source, the display apparatus comprising:
    a displayer to display the image;
    a key input unit to generate a key signal according to a user's manipulation; and
    a display controller to determine a current display state of the displayer and to set the key input unit to implement a power on function if the current display state is power off, to implement a screen adjustment function if the displayer is in one or more first power on display states, and to implement a power off function if the displayer is in one or more second power on display states.

2. The display apparatus according to claim 1, wherein the display controller sets the function of the key input unit to an automatic screen adjustment function of the key input unit when the determined current display state is a game state or a dos state.

3. The display apparatus according to claim 2, further comprising an OSD generator which displays an OSD on the displayer, wherein the display controller controls the OSD generator to display on the displayer according to the key signal when the determined current display state is the game state or the dos state.

4. The display apparatus according to claim 1, further comprising a configuration controller to control the displayer to change the display state of the displayer.

5. The display apparatus according to claim 4, wherein the display controller controls the display state of the image according to the key signal.

6. The display apparatus according to claim 4, wherein the display controller is capable of turning power on or off according to the key signal when the image signal is not received from the image signal source.

7. A display system displaying an image on a basis of an image signal received from an image signal source, comprising:
    a key signal generator generating a key signal according to a user's manipulation;
    a configuration controller providing a graphical user interface (GUI) for controlling a display state of the image, and outputting a control order corresponding to the user's manipulation on the GUI, and detecting whether a user's access to the GUI is limited; and
    a display controller controlling the display state of the image on a basis of the control order received from the configuration controller, recognizing the input key signal as a first control signal to implement a pre-set control function according to the recognized first control signal if the key signal is inputted from a key signal input part while determining through the configuration controller that the user's access to the GUI is not limited, and recognizing the input key signal as a second control signal and controlling the display state of the image according to the recognized second control signal if the key signal is inputted from the key signal input part while determining through the configuration controller that the user's access to the GUI is limited,
    wherein the configuration controller comprises a display state configuration program installed in the image signal source and being driven based on an operating system of the image signal source, and
    wherein the display state configuration program recognizes that the user's access to the GUI is not limited when a size of the image provided by a program activated on the operating system of the image signal source is smaller than a size of a desktop screen provided by the operating system of the image signal source, and recognizes that the user's access to the GUI is limited when the size of the image provided by the program activated the operating system of the computer is bigger than the size of the image of the desktop screen provided by the operating system of the computer.

8. The display system according to claim 1, wherein the display state configuration program reads data on the size of the image provided by the activated program and the size of the desktop screen provided by the operating system from a registry of the image signal source.

9. The display system according to claim 8, wherein the display controller implements an automatic screen adjustment function when the key signal is recognized as the second control signal.

10. The display system according to claim 8, further comprising an OSD generator displaying an OSD screen for controlling the display state of the image, wherein
the display controller controls the OSD generator to display the OSD screen when the inputted key signal is recognized as the second control signal.

11. The display system according to claim 8, wherein the display controller turns power on or off according to the first control signal when the inputted key signal is recognized as the first control signal.

12. The display system according to claim 11, wherein the display controller recognizes the key signal as the first control signal to turn the power on or off according to the first control signal when the key signal is inputted from the key signal input part while the image signal is not received from the image signal source.

13. The display system according to claim 1, wherein the display state configuration program outputs a function preservation signal if the user's access to the GUI is not limited.

14. The display system according to claim 13, wherein the display state configuration program outputs the function preservation signal continuously if determined that the user's access to the GUI is not limited, and blocks the output of the function preservation signal if the user's access to the GUI is limited.

15. The display system according to claim 1, wherein the display state configuration program outputs a function shift signal if the user's access to the GUI is limited.

16. A method of controlling a display state of an image provided by an image producing apparatus, the method comprising:
generating a key signal according to a manipulation of a key on a display;
when the key is manipulated and if it is determined that access to a graphical user interface (GUI) provided by the image producing apparatus is not limited, recognizing the inputted key signal as a first control signal to implement a pre-set control function according to the recognized first control signal; and
when the key is manipulated and if it is determined that access to the GUI is limited, recognizing the inputted key signal as a second control signal to control the display state of the image according to the recognized second control signal,
wherein recognizing that the user's access to the GUI is not limited occurs when a size of the image provided by a program activated on the operating system of the image signal source is smaller than a size of a desktop screen provided by the operating system of the image signal source, and
wherein recognizing that the user's access to the GUI is limited when the size of the image provided by the program activated the operating system of the computer is bigger than the size of the image of the desktop screen provided by the operating system of the computer.

17. The method according to claim 16, wherein a display state configuration program outputs a function preservation signal if the user's access to the GUI is not limited.

18. The method according to claim 16, wherein a display state configuration program outputs a function shift signal if the user's access to the GUI is limited.

19. The method according to claim 16, wherein a display state configuration program outputs a function preservation signal continuously if determined that the user's access to the GUI is not limited, and blocks the output of the function preservation signal if the user's access to the GUI is limited.

20. The method according to claim 16, further comprising:
receiving at the display a function preservation signal generated by the image producing apparatus if the access to the GUI is not limited; and
determining whether access to the GUI is limited according to the received function preservation signal.

21. A method of controlling a display state of an image provided by an image producing apparatus, the method comprising:
determining whether a key on a display has been manipulated and generating a key signal according to the manipulation of the key on the display if the key has been manipulated;
when the key is manipulated and if it is determined that access to a graphical user interface (GUI) provided by the image producing apparatus is not limited, recognizing the inputted key signal as a first control signal to implement a pre-set control function according to the recognized first control signal;
when the key is manipulated and if it is determined that access to the GUI is limited, recognizing the inputted key signal as a second control signal to control the display state of the image according to the recognized second control signal,
wherein recognizing that the user's access to the GUI is not limited occurs when a size of the image provided by a program activated on the operating system of the image signal source is smaller than a size of a desktop screen provided by the operating system of the image signal source, and
wherein recognizing that the user's access to the GUI is limited when the size of the image provided by the program activated the operating system of the computer is bigger than the size of the image of the desktop screen provided by the operating system of the computer; and
when the key is not manipulated and the access to the GUI is not limited, changing the display state according to a manipulation of the GUI.

22. The method according to claim 21, further comprising, when the key is not manipulated and the access to the GUI is not limited, generating the GUI on the display using a program resident on the image producing apparatus.

23. A computer readable medium encoded with processing instructions for performing a method of controlling a display state of an image provided by an image producing apparatus performed by a computer connected to an image producing apparatus, the method comprising:
receiving a generated key signal according to a manipulation of a key on a display;
when the key is manipulated and if it is determined that access to a graphical user interface (GUI) provided by the image producing apparatus is not limited, recognizing the inputted key signal as a first control signal to implement a pre-set control function according to the recognized first control signal; and
when the key is manipulated and if it is determined that access to the GUI is limited, recognizing the inputted key signal as a second control signal to control the display state of the image according to the recognized second control signal, wherein recognizing that the user's access to the GUI is not limited occurs when a size of the image provided by a program activated on the operating system of the image signal source is smaller than a size of a desktop screen provided by the operating system of the image signal source, and wherein recognizing that the user's access to the GUI is limited when the size of the image provided by the program activated the operating system of the computer is bigger than the size of the image of the desktop screen provided by the operating system of the computer.

24. The computer readable medium according to claim 23, wherein the method further comprises detecting at the display a function preservation signal generated by the image producing apparatus if the access to the GUI is not limited, and determining whether access to the GUI is limited according to the detected function preservation signal.

25. The computer readable medium according to claim 23, wherein when the key is not manipulated and the access to the GUI is not limited, changing the display state according to a manipulation of the GUI.

26. The computer readable medium according to claim 25, wherein when the key is not manipulated and the access to the GUI is not limited, generating the GUI on the display using a program resident on the image producing apparatus.

* * * * *

UNITED STATES PATENT AND TRADEMARK OFFICE
CERTIFICATE OF CORRECTION

| | | |
|---|---|---|
| PATENT NO. | : 7,542,027 B2 | Page 1 of 1 |
| APPLICATION NO. | : 11/009541 | |
| DATED | : June 2, 2009 | |
| INVENTOR(S) | : Dong-sik Park et al. | |

It is certified that error appears in the above-identified patent and that said Letters Patent is hereby corrected as shown below:

Column 10, Line 3, after "on" delete "the".

Column 11, Line 1, change "claim 1," to --claim 7,--.

Column 11, Line 26, change "claim 1," to --claim 7,--.

Column 11, Line 35, change "claim 1," to --claim 7,--.

Signed and Sealed this

Twenty-seventh Day of October, 2009

David J. Kappos
*Director of the United States Patent and Trademark Office*